United States Patent [19]

Messina et al.

[11] 3,958,222
[45] May 18, 1976

[54] RECONFIGURABLE DECODING SCHEME FOR MEMORY ADDRESS SIGNALS THAT USES AN ASSOCIATIVE MEMORY TABLE

[75] Inventors: Benedicto U. Messina; Arnold Weinberger, both of Poughkeepsie, N.Y.

[73] Assignee: IBM Corporation, Armonk, N.Y.

[22] Filed: June 27, 1974

[21] Appl. No.: 483,866

[52] U.S. Cl. .................................. 340/172.5
[51] Int. Cl.² .................................. G06F 9/10
[58] Field of Search ............... 445/1; 340/172.5

[56] References Cited
UNITED STATES PATENTS

| | | | |
|---|---|---|---|
| 3,533,075 | 10/1970 | Johnson et al. | 340/172.5 |
| 3,585,605 | 6/1971 | Gardner et al. | 340/172.5 |
| 3,676,857 | 7/1972 | Jackson | 340/172.5 |
| 3,691,531 | 9/1972 | Saltini et al. | 340/172.5 |
| 3,764,996 | 10/1973 | Ross | 340/172.5 |
| 3,840,863 | 10/1974 | Fuqua et al. | 340/172.5 |

*Primary Examiner*—Mark E. Nusbaum
*Attorney, Agent, or Firm*—James E. Murray

[57] ABSTRACT

This specification describes an associative memory decoder for a memory system in which the units in the memory system are reconfigurable both in size and in number. The decoder is designed to take an address for that memory system and address memory space in the memory system irrespective of the amount of storage in the system so that the decoder has to change as memory capacity is added or subtracted from the memory system.

5 Claims, 9 Drawing Figures

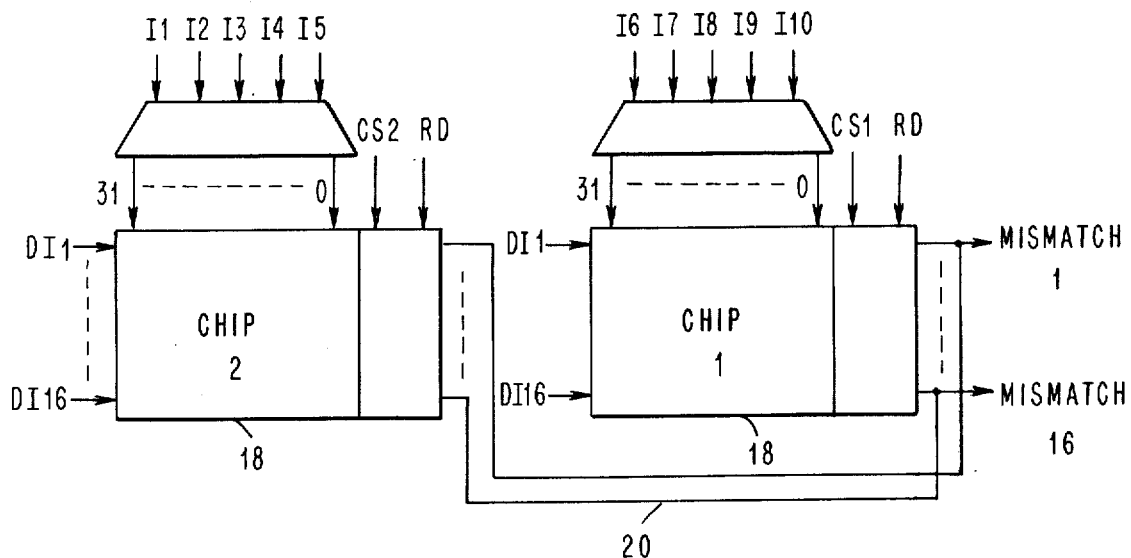
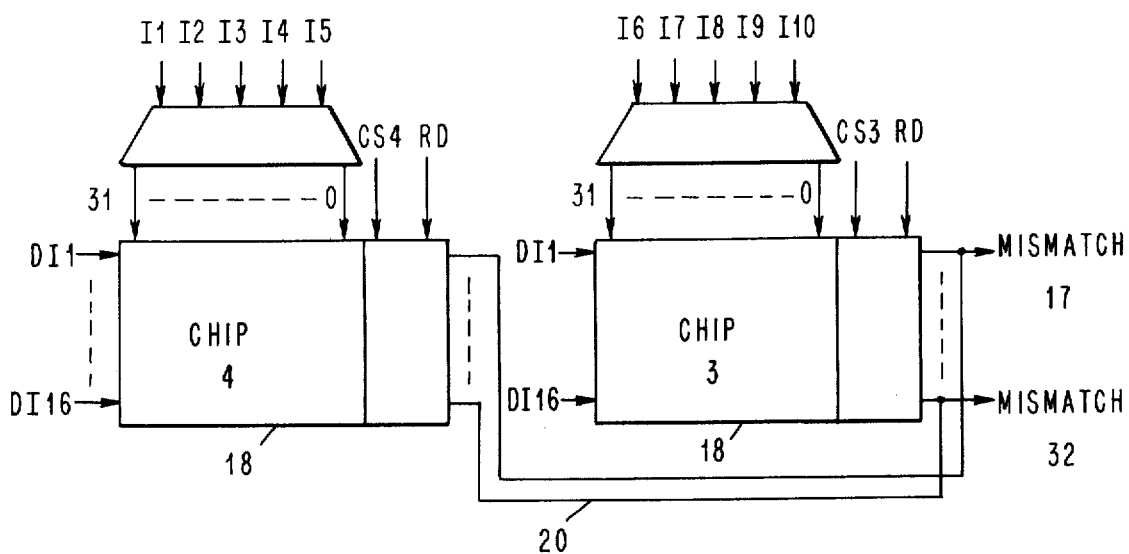
FIG. 2

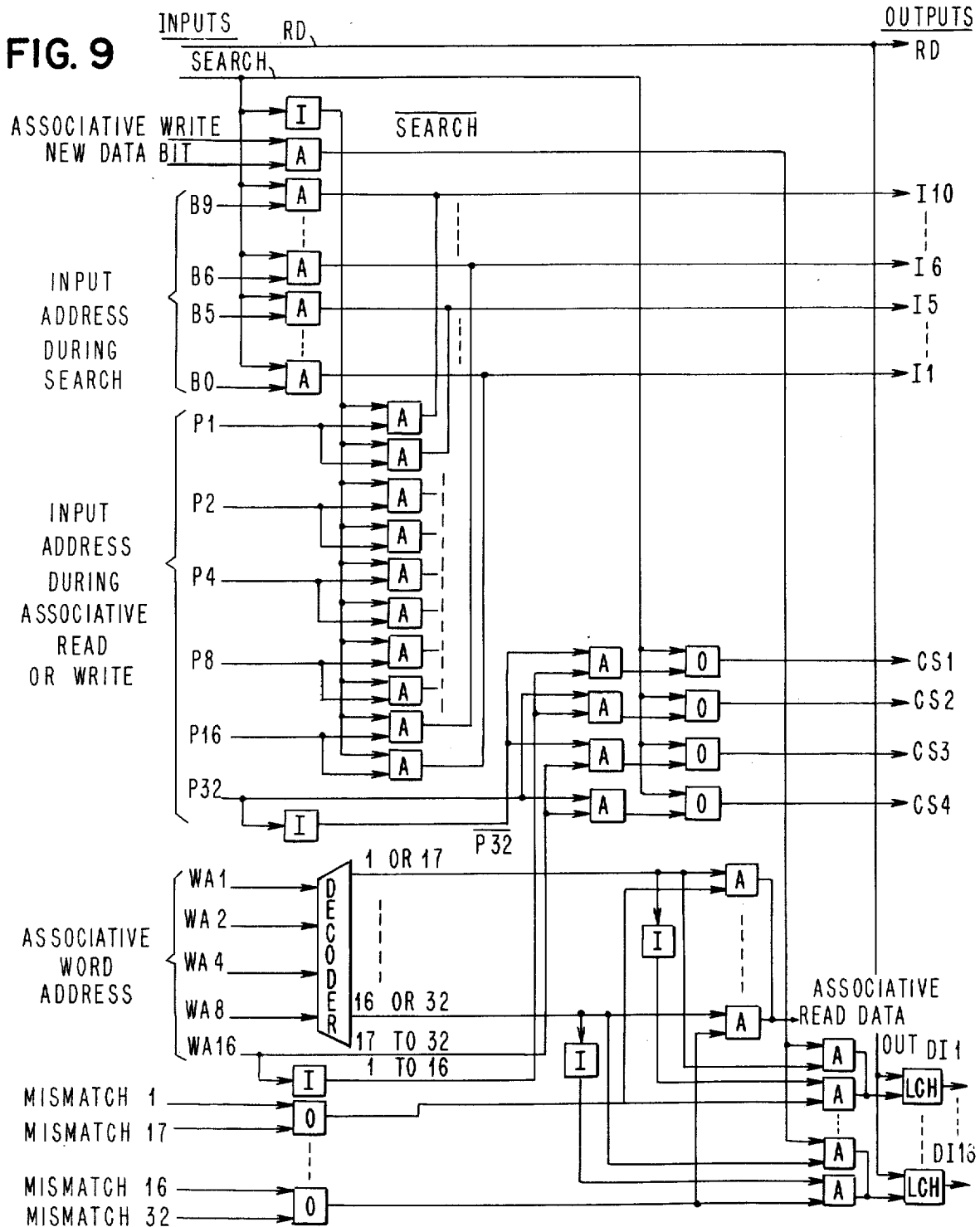

RECONFIGURABLE DECODING SCHEME FOR MEMORY ADDRESS SIGNALS THAT USES AN ASSOCIATIVE MEMORY TABLE

BACKGROUND OF THE INVENTION

Present invention relates to decoders for memory units and more particularly to decoders for memory units in which the amount and configuration of the storage within the unit can be changed.

In modern data processing systems, memory units are provided with varying amounts of storage. For instance, a memory unit could be built containing 1 to 32 megabytes of storage in units varying in size from one to eight megabytes each. Each unit could be considered a basic storage module (BSM) and each time a BSM is added or subtracted from the meory, the decoding circuit for the addresses supplied to the meory by the processor must be reconfigured. In the past, the reconfiguration of the decorders has generally been performed by rewiring conventional decoder logic in the memory unit. Of course, this involves significant expense and requires tailoring of the decoding circuit to the various combinations of BSM's that may be used. Dynamically reconfigurable decoders have been proposed to eliminate the need for rewiring but up until now the suggested decoders have not been entirely satisfactory because of complexity, limited flexiblity, or cost.

SUMMARY OF THE INVENTION

In accordance with the present invention, a new dynamically reconfigurable decoder is proposed. It is a work oriented array which is associatively interrogated by address bits for the memory system through a decoder. When the array is associatively interrogated, one or more but not all of the bit positions of all the word lines of the array are accessed providing a single digit binary output signal on each word line of the array. The output signals for the array are used to access the BSM'in the memory system thereby making BSM selection dependent on the data stored in the array. Therefore, the configuration of the associative decoder can be changed by altering the data stored in the array allowing changing of the decoder to match the number and configuration of the BSM's in the memory system.

Therefore, it is an object of the present invention to provide decoding circuitry for reconfigurable memory systems.

It is another object of the invention to provide decoding circuitry in which the amount and configuration of the storage addressed by the decoder can be changed without physically changing the decoder.

Other objects of the invention are to provide a decoding circuit in which it is possible to use different size BSM's within the same system without physically modifying decoding circuitry and to provide dynamically changeable decoding circuitry which is relatively simple and inexpensive.

The foregoing and other specifications, features and advantages of the present invention will be apparent from the following description of a preferred embodiment of the invention as illustrated in the accompanying drawings of which:

DESCRIPTIONS OF THE DRAWINGS

FIG. 2 is a schematic diagram of an array that may be used as the associatively interrogated decoder in the present invention;

FIG. 8 is a table showing the timing of signals necessary to read or write into the associative table;

FIG. 9 is a logic circuitry for performing read, write and associative searching operations with the array of FIG. 2.

DETAILED DESCRIPTION

Figure 1:
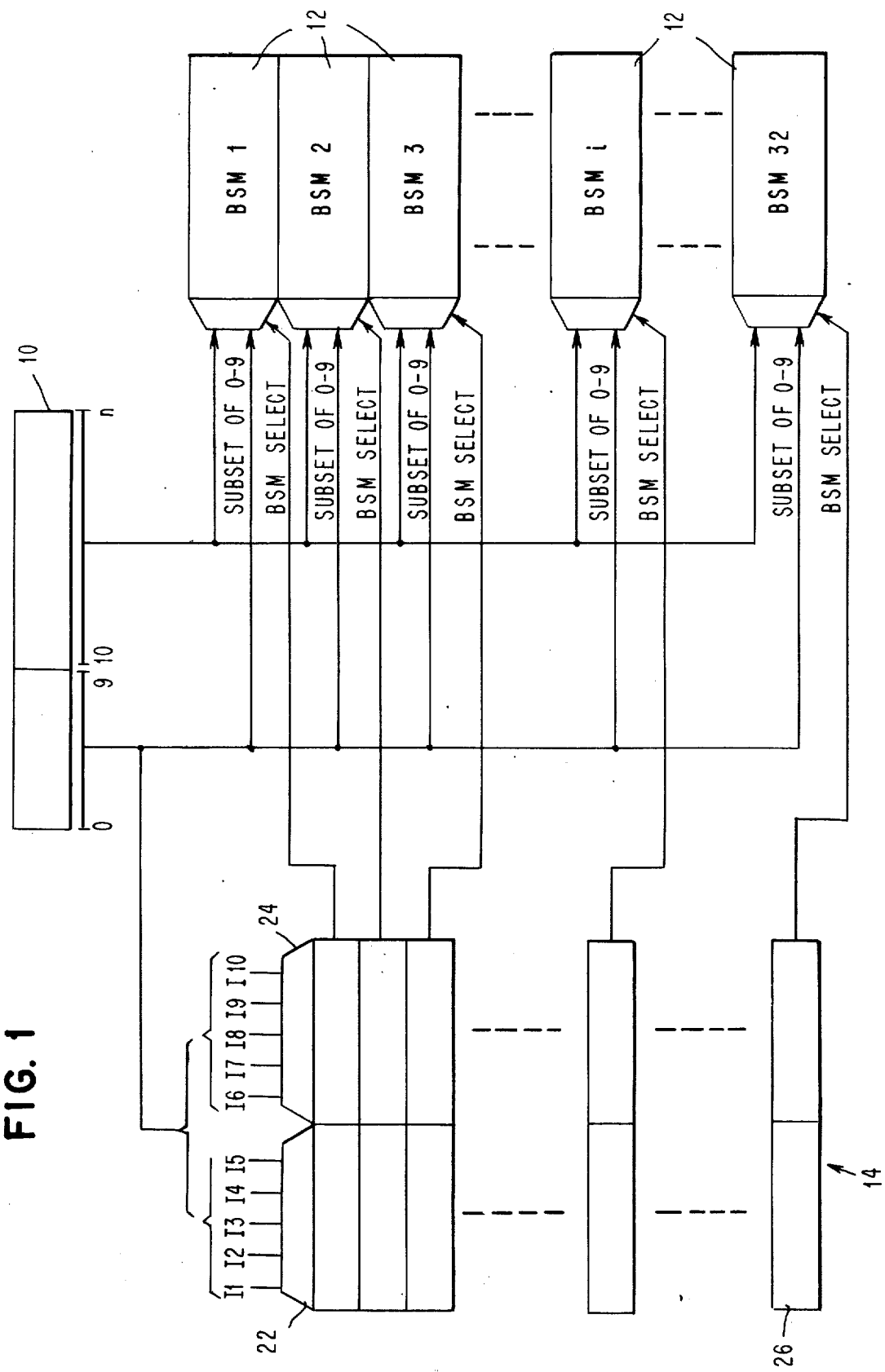
FIG. 1 is a schematic diagram of a memory system using an associatively interrogated decoder configured in accordance with the present invention.

Referring to FIG. 1, a processor provides an address 10 to access a memory system containing a plurality of basic storage modules 12 which can vary in size and in number in to memory system accessed by the processor. To accommodate the varying size and number of these modules 12, the address 10, supplied to the memory system by the processor, is divided into two portions. The first portion of the address or bits 0 through 9 is fed to an associative array 14 that controls the BSM select lines which in turn limit addressing of the BSM's 12 by the second portion of the address or bits 10 to n, and by a subset of the address bit 0 through 9. Each word of the associative array 14 controls one of the BSM select lines so that when the associative array 14 is associatively searched by the bits 0 through 9, access to one or more of the BSM's 12 is supplied through the BSM select lines physically connected to the word or words of the array supplying a true response to the interrogation while access is denied to the other BSM's. The decoders may be of the type shown in U.S. Pat. No. 3,761,902, filed on Dec. 30, 1971, and described in connection with FIG. 6.

FIG. 2 shows how the associative array decoder 14 can be fabricated using a plurality of conventional array chips 18. The bits of the chips are arranged in 32 words each made up of 16 bit positions. The array chips perform two mutually exclusive operations, read and write. Which operation is performed is determined by the function select signal RD. When RD = 1 a read operation is performed by the chip. When RD = 0 a write operation is performed by the chip. During a read operation, an address signal of five bits selects one of the 32 columns of memory cells, i.e., one of the 32, 16-bit words causing data stored in the selected 16-bit word to appear on the data output lines. During write, the address signal again selects one of the 32, 16-bit words permitting input data bits DI1 through DI16, to replace the data stored in the selected cells.

Another control signal for the array is the chip select signal CS. When the chip select signal is one (CS=1) the chip will perform a read or write operation when it is properly accessed. However, when the chip select signal is zero (CS=0) the chip will not perform a read or write operation when an address signal, input data and a function select signal are supplied to it. Because of control provided by chip select signal CS two or more array chips can be combined to provide arrays with bit and word capacities which are multiples of the capacity of the individual chips. This expansion of the capacity of the array is obtained by the ORing of the outputs of the array with wires 20 and by the selective use of the chip select signals. Furthermore, by interrogating the 4 array chips in the manner shown in FIG. 7 this expanded composite array can be used to perform associative functions and in particular to perform the associative operation of SEARCH or INTERROGATE.

In performing the associative functions, the operation of the individual chips remains the same but is redefined in terms of an associative table by the manner in which the chips are accessed and the terminology applied to the accessing signals. The word address decoder becomes the search input decoder by feeding the memory decode signals to them and referring to the decode signals as a search input. In the array shown in FIG. 2 the first 5 digits I1 through I5, of the search input goes to the decoders of the left hand chips, and the remaining 5 digits I6 through I10 of the search input go to the decoders of the right hand chips. In this way the 4 chips are combined into an associative array comprising 32 associative words made up of two 32-bit associative cells each.

To perform an associative search operation using this array, the function select signal RD and the chip select signals, CS1 through CS4, are all made equal to 1 (RD, CS, CS3 and CS4 = 1), and 32 words of data are stored in the array chips to provide associative search match and mismatch signals on the outputs DO1 to DO32 of the array to the interrogation signals I1 to I10. Each combination of interrogation signals I1 to I10 interrogates a different one of the 32 bit lines in each half of the associative array. If there is a zero stored in the accessed bit position in both halves of word line one in the associative array a match signal activates the BSM select line attached to that work line. If not, a mismatch signal is provided at the output on the line and the BSM select line attached thereto blocks address signals to the BSM controlled by the BSM select line.

Figure 3:
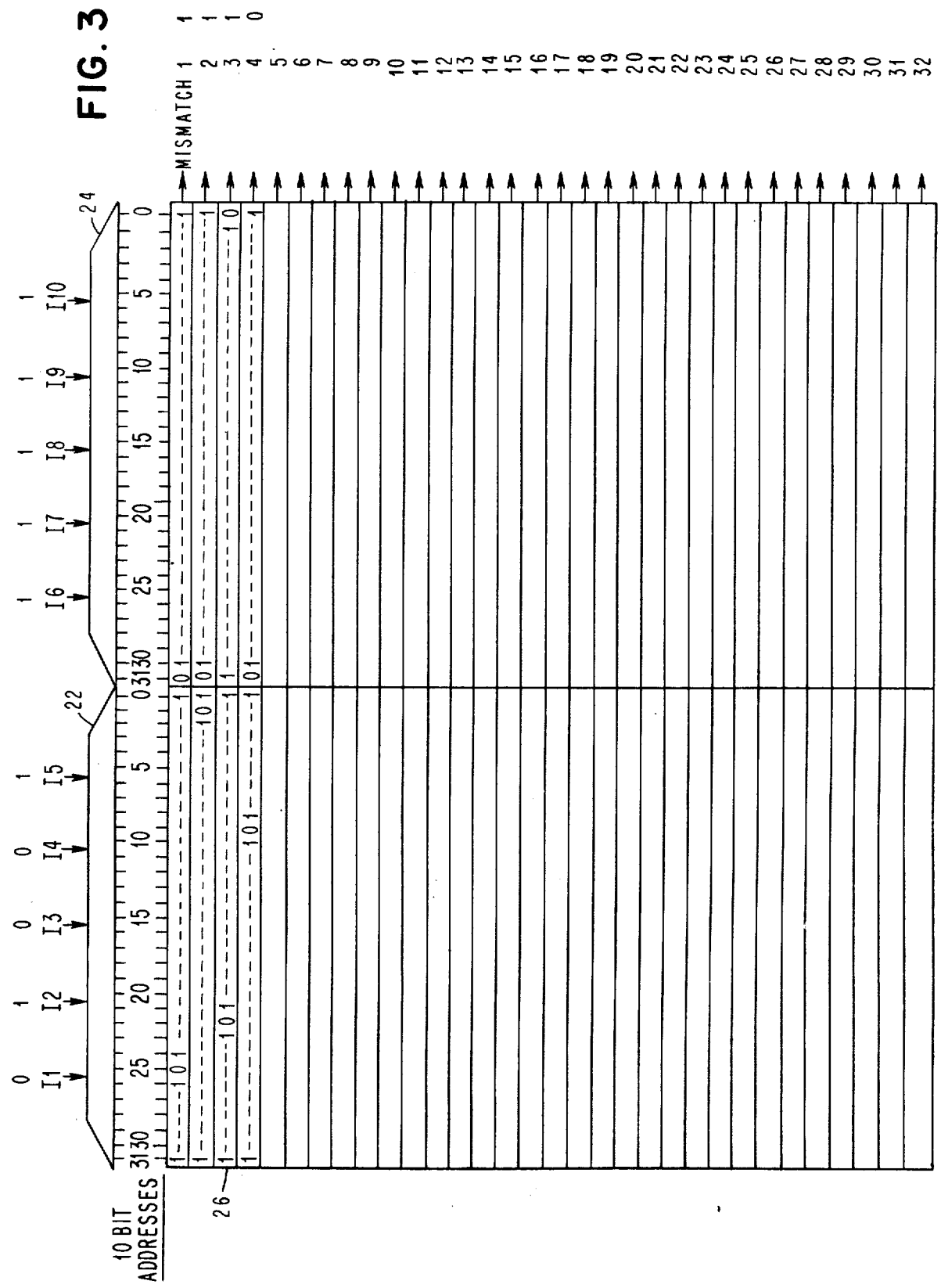
FIGS. 3 through 7 are schematic representative of the data stored in the array of FIG. 2 for various configurations of the memory system of FIG. 1.

For a better understanding of this, reference is made to FIG. 3. Here the array is shown addressed through two decoders 22 and 24 by the first 10 digits of the memory address 10. The bit pattern for the first four words stored in the associative array 26 is shown as are the values of the address digits or search word interrogating the array 26. The left half of the search word, 01001 (binary representation of 9) enters the left partition 22, while the right half of the search work, 11111 (binary representation of 31) enters the right partition 24. The left half of stored work 1 (11001=25) is stored as a 32-bit number with a single 0 in column 25 of the first row in the left partition, while the right half (11111=31) is stored with a single 0 in column 31 of the left partition. The two halves of word 2 (00001=1and 11111=31) are stored with a single 0 in column 1 of the left partition and a single 0 in column 31 of the right partition. The two halves of word 3 (10110= 22) and 00000=0) are stored with a single 0 in column 22 of the left partition and a single 0 in column 0 of the right partition. The two halves of word 4 (01001=9 and 00000=31) are stored with a single 0 in column 9 of the left partition and a single 0 in column 31 of the right partition. It is clear that only column 9 of the left partition and column 31 of the right partition are selected and only word 4 finds 0's in both of these columns to produce a 0 in its MISMATCH 4 output, indicating that word 4 matches the search input. Each of the first three words finds a 1 in at least one of the two selected columns to produce a 1 on the corresponding mismatch line. Thus only the fourth BSM 12 is permitted to receive address signals by a match signal applied to the BSM select line controlling access to the BSM.

Figure 4:
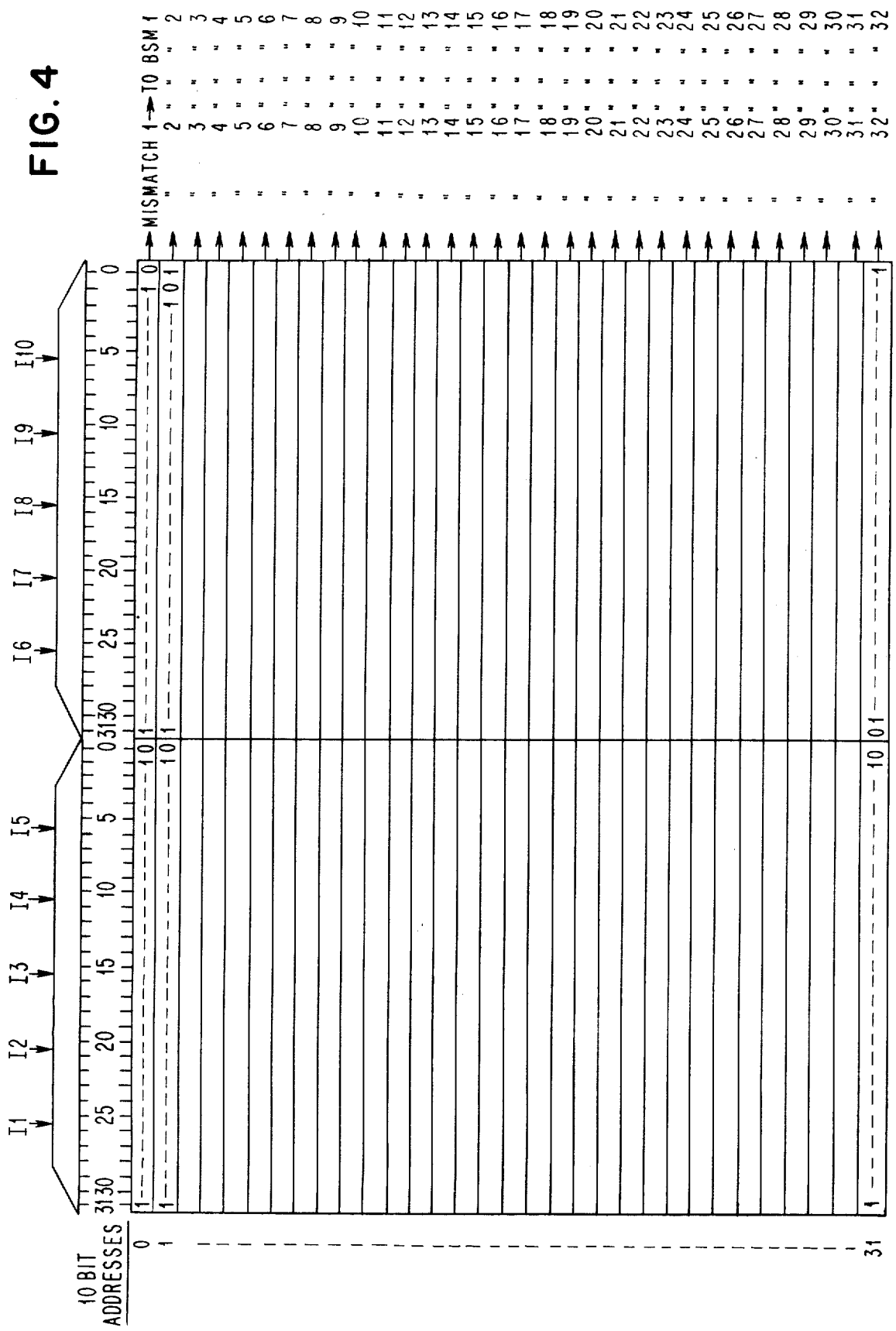

The redundancy inherent in using a 32-bit cell to simulate 5 bits of associative storage provides flexiblity in adapting the decoder of the present invention to a wide variety of memory configurations. This is demonstrated in FIGS. 4 through 7. FIG. 4 shows a linear mapping of 32 10-bit addresses into a selection signal for a memory containing 32 BSM's of one megabyte (MB) each. The first BSM (BSM1) is assigned to word 1 of the associative table and includes the 10-bit address 0. Both the low-order and high-order 5 bits include only the combination 00000, so that that 32-bit cells have a single 0 in column 0. The second BSM (BSM2) is assigned to work 2 and includes the 10-bit address 1. The low-order 5 bits include only the combination 00001 while the high-order 5 bits include the combination 00000, so that the respective 32-bit cells contain a single 0 in column 1 and column 0 respectively. The other BSM's are similarly assigned with sequential low-order 5-bit combinations and corresponding 32-bit cells appropriately filled with 1's and a single 0.

Figure 5:
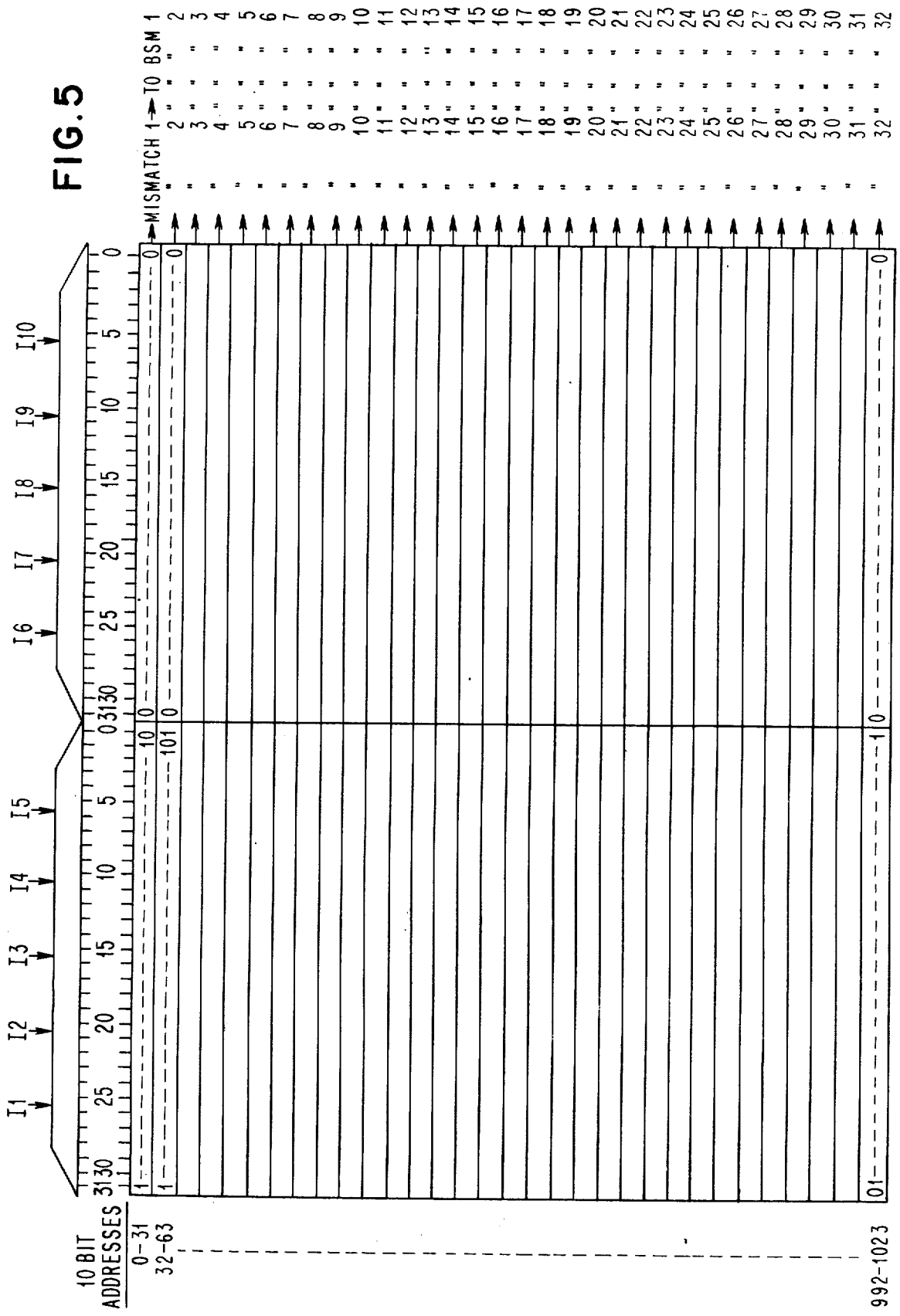

FIG. 5 shows a linear mapping of all 10-bit addresses into a selection signal for a memory containing 32 BSM's of 32 MB each. The first BSM (BSM1) is assigned to word 1 of the associative table and includes the 10-bit addresses 0 through 31. The low-order 5 bits include all 32 combinations 0-31, so that the 32-bit cell contains all 0's. The high-order 5 bits include only 00000, so that its 32-bit cell contains a single 0 in column 0. The second BSM (BSM2) is assigned to word 2 of the associative table and includes the 10-bit address 32-63. The low-order 5 bits again include all 32 combinations, 0-31, and its 32-bit cell contains all 0's. The high-order 5 bits include only 00001, so that its 32-bit cell contains a single 0 in column 1. The BSM's are similarly assigned sequential addresses and the corresponding 32-bit cells appropriately filled.

Figure 6:
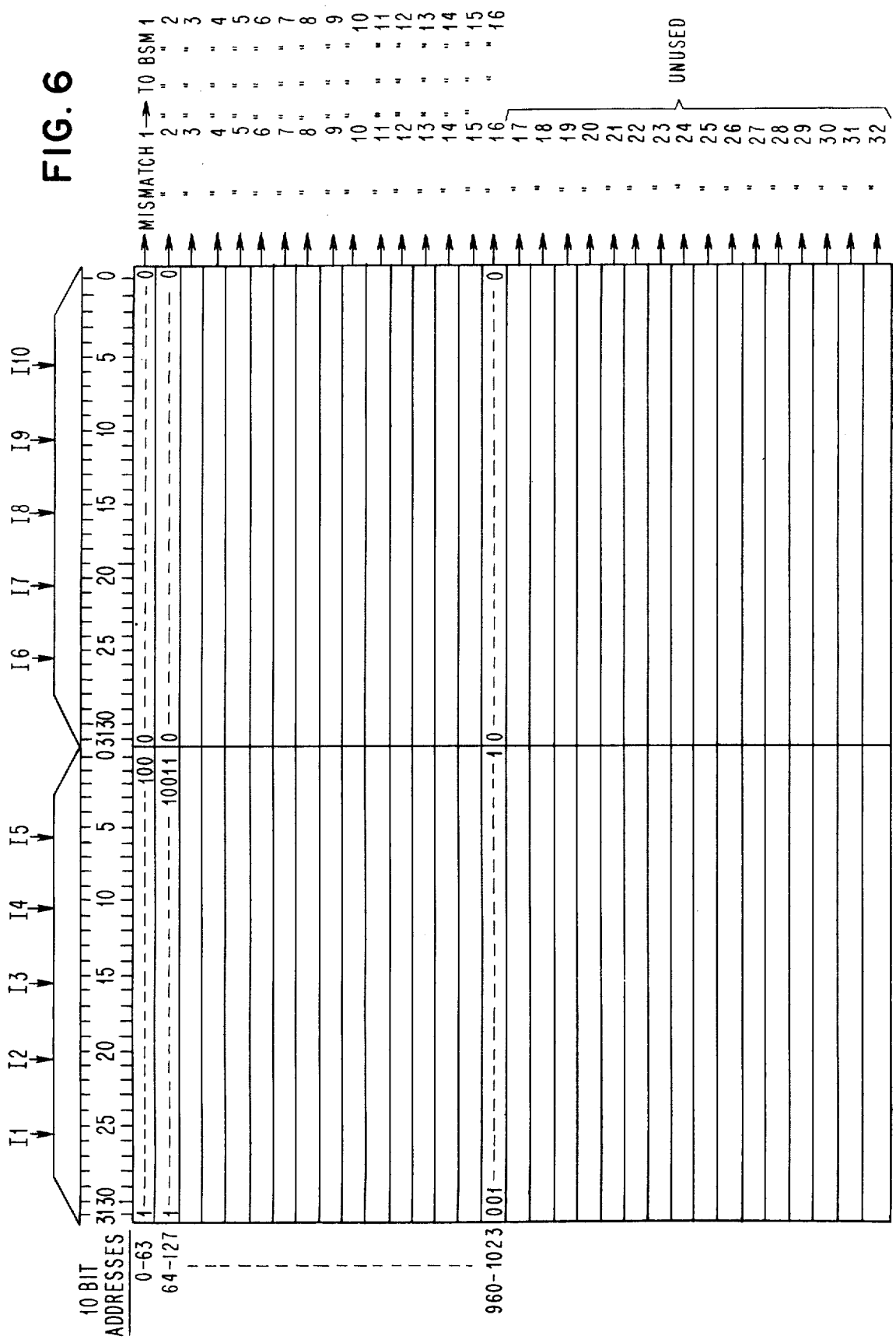

FIG. 6 shows a linear mapping of all 10-bit addresses into a selection signal for each of 16 BSM's of 64 MB each. The first BSM (BSM1) is assigned to word 1 of the associative table and includes the 10-bit addresses 0-63. The low-order 5 bits include all 32 combinations and the 32-bit cell contains all 0's. The high-order 5 bits include the combinations 00000 and 00001, so that its cell contains a 0 in columns 0 and 1. The second BSM (BSM2) is assigned to word 2 of the table and includes the next 64 10-bit addresses 64-127. The low-order 5 bits again include all 32 combinations, so that the 32 bit cell is all 0's. The high-order 5 bits include the combinations 00010 and 00011, so that its cell contains 0's in columns 2 and 3. The other BSM's are similarly assigned sequential addresses and the corresponding cells appropriately filled. The lower half of the words are unused.

Figure 7:
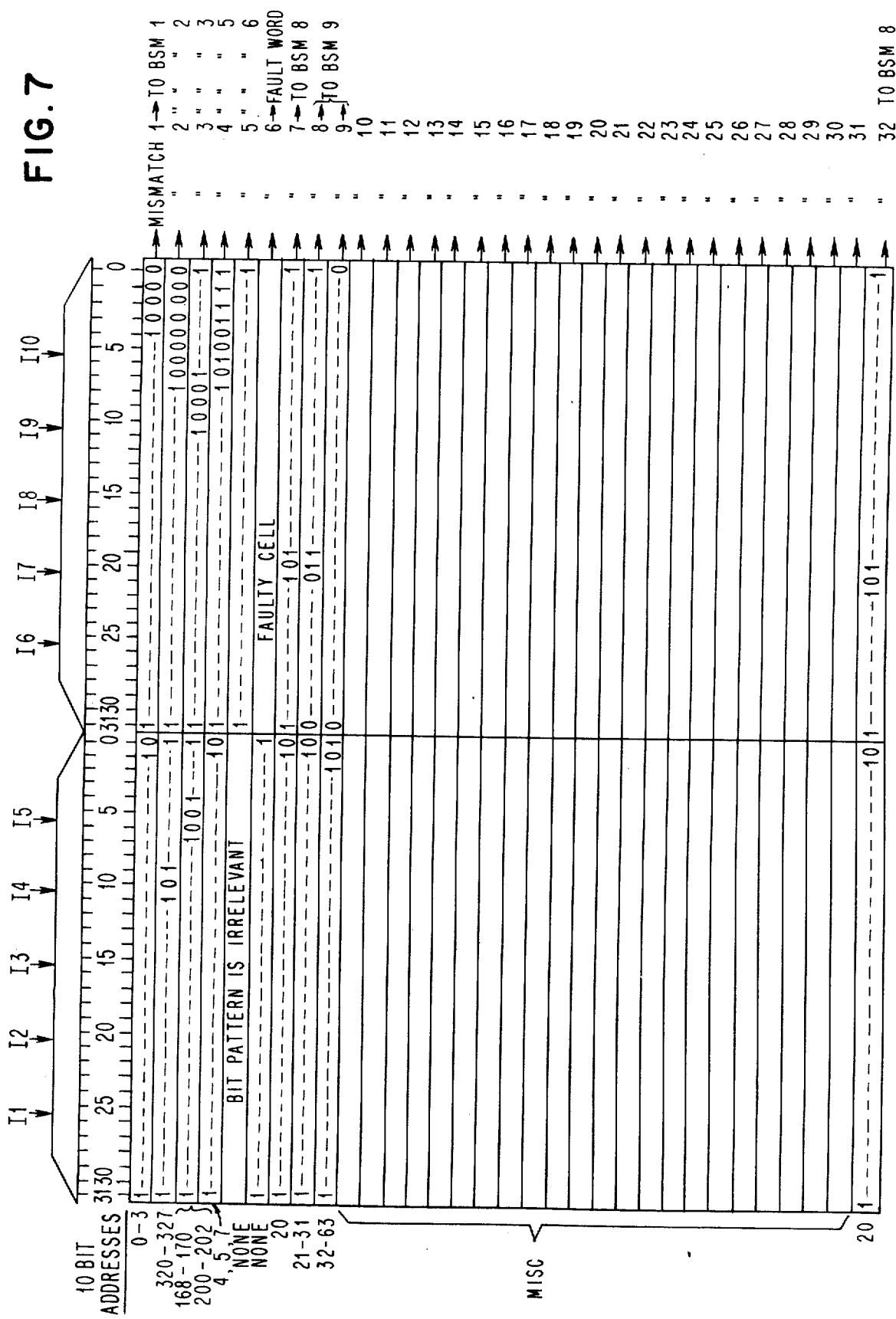

FIG. 7 shows non-linear addressing of BSM's in a combination of sizes. The first BSM (BSM1) contains 4MB and is assigned to word 1. It includes the 10-bit addresses 0 through 3. The low-order 5 bits include combinations 00000 through 00011, so that the 32-bit cell contains 0's in columns 0 through 3. The high-order 5 bits include only the combination 00000, so that its cell contains a single 0 in column 0. The second BSM (BSM2) conttains 8MB and is assigned to word 2. It includes the 8 10-bit addresses 320-327. The low-order 5 bits include only the combinations 00000-00111, so that the 32-bit cell contains 0's in columns 0 through 7. The high-order 5-bits include the single combination 01010, so that the 32-bit cell contains a single 0 in column 10. BSM3 contains 6MB, which is not a power of 2, and is assigned two non-consecutive sequences of 10-bit address, 168-170 and 200-202. The low-order 5 bits include combinations 01000, 01001, and 01010, so that the 32-bit cell contains 0's in columns 8, 9 and 10. The high-order 5 bits include combinations 00101 and 00110, so that the 32-bit cell contains 0's in columns 5 and 6.

In FIG. 7, BSM5 has 4MB of storage and originally was assigned the four consecutive 10-bit addresses, 4-7 so that originally there were 4 consecutive 0's in the right hand segment of word four in bit positions 40 to 7. While in operation an error appeared in the third MB affecting the 10-bit address 6. The error cannot readily be corrected, so that it was necessary to down-grade BSM5 to the 3 operational MB and eliminate the 0 in bit position 6 so that the memory can only be accessed with addresses 4, 5 and 7. The high-order 5 bits include only the combination 00000, so that the 32-bit cell contains a single 0 in column 0.

BSM6 was assigned word 5 in the table and for some reason has to be deselected completely. This is done by loading one or the other or both 32-bit cells with all 1's. In this example, the right cell contains all 1's while the left cell contents is irrelevant. As a result, no 10-bit address will cause BSM6 to be selected.

Assume that the right cell of word 6 has become faulty, so that words cannot be used to access a BSM. Prevention of the use of word is accomplished by loading all 1's into the left hand cell or the good cell of the word. As a result MISMATCH 6 will always be 1 during search.

In FIG. 7, BSM8 of 1MB capacity is assigned the 10-bit address 20. For added reliability, the address is assigned to two different words in the table, one in the top half (top chips) and one in the bottom half (bottom chips), e.g. words 7 and 32. Thus, the AND of MISMATCH 7 and MISMATCH 32 determines the selection of BSM8. The low-order 5-bits of the address is 10100, so that the corresponding 32-bit cell contains a single 0 in column 20. The high-order 5-bits of the address includes only the combination 00000, so that 32 bit cell contains a single 0 in column 0.

In the previous examples, the assignment of 10-bit addresses to a BSM required only a single word in the associative table. This is equivalent to storing a logic function of 10 variables in a single word of a search table in which the 10 variables enter two 5-input partitions. The logic functions of the 10 variables is expressed as a sum of two subfunctions, a subfunction of the 5 input variables I1 through I5 ORed with a subfunction of the input variables I6 through I10. However, not all logic functions of 10 variables can fit into a single word in this search table, i.e., some logic functions of 10 variables cannot be expressed as a single sum of subfunctions. Instead, they must be expressed as a product of sums of subfunctions, for example the formula $$F(I1, \ldots, I10) = [f1(I1, \ldots, I5) + g1(I6, \ldots, I10)] \cdot [f2(I1, \ldots, I5) + g2(I6, \ldots, I10)]$$

represents a function of I1 through I10 which is a product of two sums of subfunctions, requiring two words of the search table to be ANDed. The first word stores the sum of the first two subfunctions (f1+g1), while the second word stores the sum of the second two subfunctions (f2+g2).

This situation is covered by assigning 10-bit addresses 21-63 to BSM9 which contains 43MB. These addresses cannot fit into a single word in the table. They can, however, fit into two words. Therefore, they are assigned to words 8 and 9. Word 8 contains addresses 21-31, while word 9 contains addresses 32-63. The low-order 5 bits of addresses in word 8 include combinations 10101-11111, so that the 32-bit cell contains 0's in columns 21-31. The high-order 5 bits include the single combination 00000, so that the 32-bit cell contains a single 0 in column 0. The low-order 5 bits of addresses in word 9 include all combinations 00000 through 11111, so that the 32-bit cell contains all 0's. The high-order 5 bits include the single combination 00001, so that the 32-bit cell contains a single 0 in column 1. It can be shown that the assignment of the 10-bit addresses to words 8 and 9 can also be made as follows: 21-31 and 53-63 to word 8, and 32-52 to word 9. In fact, some of the addresses can be assigned to both words as follows: 21-31 and 53-63 to word 8, and 32-63 to word 9. The outputs of words 8 and 9, MISMATCH 8 and MISMATCH 9, when ANDed, represent the select signal for BSM9 (Note, again, the select signal is in complement form, 0 for select, 1 for not select).

Above we have described how the search operation can be performed using the array shown in FIG. 2. Before that array can be used as a decoder it must be capable of performing associative read and write operations.

The associative write operation is used to personalize the associative table either to initialize the table or merely to update the table. It is expected to be performed very infrequently, so that it is designed to use as little peripheral logic as possible at the expense of taking a number of cycles to be performed. The operation will write a word into a specified word position in the table. If more than one word position is to be written into, a separate associative write operation is performed for each word. The operation makes use of both a conventional read as well as a conventional write operation. It takes 128 cycles to write one word into the table, one bit per two cycles.

The associative read operation is used for reading out the full or part of the associate table. The purpose is to check the contents of the table. It is also expected to be performed very infrequently, so that little peripheral logic is provided. Instead, the operation takes a number of cycles. As with associative write, the operation will affect one word of the associative table. Each associative word to be read out will require a separate associative read operation. Associative read makes use of conventional read, but in a different way than the search operation uses it. It takes 64 cycles to read one associative word from the table, one bit per cycle.

FIG. 8 shows the sequence of cycles comprising the associative write and the associative read of a specified associative word in the table. (The associative word is specified by 5-bit associative word address to be described later.) The 64 bit columns representing the two columns of 32-bit cells, are addressed sequentially as columns 0 through 63 by a 6-bit input address. As a result, only one bit in the associative table is accessed at any one time during an associative write or read. For associative write, each of the 64 input addresses is held for 2 cycles, the first cycle to perform a conventional read and the second cycle to perform a conventional write. For associative read, each of the 64 input addresses is held for just one cycle, during which a conventional read is performed.

FIG. 9 shows the peripheral logic that controls the three associative operations. The inputs to the peripheral logic are:

RD — The signal specifies whether are conventional read or a conventional write is to be implemented with the array chips. It enters the array chips unaltered.

SEARCH — The signal specifies that an associative search operation is in progress. It is mutually exclusive with the signal ASSOCIATIVE WRITE, i.e., the two signals cannot both be on during the same cycle.

ASSOCIATIVE WRITE — The signal specifies that an associative write operation is in progress. This signal should not be confused with conventional write (RD=0).

(ASSOCIATIVE READ) — This signal is not provided but is implied by the absence of the SEARCH and ASSOCIATIVE WRITE signals. In other words, if SEARCH=ASSOCIATIVE WRITE=0, the associative read operation is in progress.

NEW DATA BIT — This signal provides the new data bit to be entered into the associative table during a conventional write cycle of an associative write operation.

A1 through A10 — These 10 signals represent the 10-bit input address to be mapped by the associative table into a BSM select signal. It is used during search as the 10-bit search word entering the associative table as I1 through I10.

P1, P2, P4, P8, P16, P32 — These 6 signals represent the 6-bit input address for selecting one of the 64 bit columns in the associative table that make up the two columns of 32-bit cells.

WA1, WA2, WA4, WA8, WA16 — These 5 signals represent the 5-bit word address to select one of the 32 words of the associative table.

MISMATCH 1 through MISMATCH 32 — These signals are the 32 outputs from the associative table. They are used during all associative operations, as will be explained below.

The outputs from the peripheral logic are:

RD — This is the input RD that enters the array chips unaltered.

I1 through I10 — These 10 signals enter the associative table as the 10-bit input.

CS1 through CS4 — These 4 signals enter the 4 array chips as 4 distinct chip select signals.

ASSOCIATIVE READ DATA OUT — This signal represents the selected bit from the associative table during one cycle of an associative read.

DI1 through DI16 — These 16 signals are the 16 data input signals common to all 4 chips and used during associative write.

During search, the read signal RD is on so that the array chips are in conventional read mode. The signal SEARCH is on permitting the input address A1 through A10 to be entered into the associative table via lines I1 through I10. At the same time, its complement signal generated by an inverter is off and inhibits the input address P1 through P16 from affecting the lines I1 through I10. Also, the SEARCH signal being on forces all 4 chip select signals CS1 through CS4 to be on via the OR gates, so that all 4 chips are selected.

During associative write, SEARCH is off and ASSOCIATIVE WRITE is on. As a result, the low-order 5 bits of the alternate input address P1 through P32 are substituted on the 10-bit input address I1 through I10, i.e., P1 enters on I10 and I5, P2 enters on I9 and I4, P4 on I8 and I3, P8 on I7 and I2, and P16 on I6 and I1. The high-order (sixth) bit, P32, together with its complement P32 help select the left or right column of chips in the associative table by controlling the chip select signals. P32 gates CS1 and CS3, while P32 gates CS2 and CS4.

As shown in FIG. 8, the ASSOCIATIVE WRITE comprises 128 cycles, beginning with a conventional read (RD=1) and alternating between conventional read and conventional write (RD=0). During the first pair of read/write cycles, the input address P1 through P32 is 0. The address increments by 1 during each subsequent pair of read/write cycles. In this way, the 64 bit columns of the associative table are sequentially selected, one column for every 2 cycles.

During the entire sequence of associative write, a constant 5-bit associative word address, WA1, WA2, WA4, WA8, and WA16 is specified. The high-order bit WA16 selects the 16 associative words in the table, words 17 through 32, located in the bottom chips, chips 3 and 4, by means of the chip select signals CS3 and CS4. Its complement selects the top 16 associative words in the table, words 1 through 16, located in the top chips, chips 1 and 2 by means of the chip select signals CS1 and CS2. The lower 4 address bits are decoded into 16 signals representing associative word select signals, word 1 or word 17, word 2 or word 18, . . . , and word 16 or word 32.

Since the array chips are organized to read and write 16 conventional bits at a time, the associative write goes through a conventional read and a conventional write cycle for each bit written into the table. During the conventional read cycle, the selected half-column of bits is read out on the mismatch lines MISMATCH 1 through MISMATCH 16 or MISMATCH 17 through MISMATCH 32. The two sets of 16 signals are ORed respectively by means of 16 OR's. The 16 outputs of the 4-bit decoder are complemented, so as to permit all but one bit to be stored into the corresponding latches. The exception is the bit selected to be replaced. The replacement bit that enters as the signal NEW DATA BIT is selected by means of the true decoded 16 outputs to enter the corresponding LATCH. The 16 latches, controlled by the conventional read condition signal RD, therefore, store the 16 bits temporarily during the cycle. During the subsequent conventional write cycle, RD becomes 0 and the 16 latch outputs are entered into the same half-column selected during the preceding conventional read cycle.

During associative read, both SEARCH and ASSOCIATIVE WRITE signals are off and the conventional read/write signal RD is on. The input address P1 through P32 and the high-order associative word address bit WA16, combine to select one of the half-columns in the associative table—the same way as in ASSOCIATIVE WRITE. The input address P1 through P32 is again sequenced through its 64 addresses 0 through 63, this time only one conventional read cycle per address. The selected half-column of bits, obtained via the ORs of MISMATCH 1 + MISMATCH 17, etc., is then selected by the 16 signals of the decoded 4-bit address WA1 through WA8 and outputted on the line labeled ASSOCIATIVE READ DATA OUT.

Therefore, while the invention has been shown and described with respect to a preferred embodiment thereof, it will be understood by those skilled in the art that various changes in form and detail may be therein without departing from the spirit and scope of the invention.

What is claimed is:

1. In a memory system including a plurality of distinct memory portions in which the amount of storage can be changed by the addition or removal of portions of memory from the memory system, a decoder for selecting a memory address within one of the portions of the memory, comprising:
 a word oriented array;
 addressing means for accessing one bit of each word in the array in response to a number of address bits k but not all of the address bits n for an address in the memory system;
 read and write means for storing and changing the data stored in the array so that the output on the word lines in the array can be selected to produce either a match or mismatch signal on each of the work lines of the array in response to an access of the array by the number of bits of the address;
 logic circuit means for coupling remaining bits n-k of the address to each of said portions in the memory to select part but not all of the data stored in that portion; and
 means coupling the word oriented array to the logic means for transmitting match and mismatch signals of each word line of the array to the logic means for one of said portions of the memory to select those portions of memory having a match signal coupled to the logic means for that portion and deselect other portions of the memory having a mismatch signal coupled to the logic means for those other portions whereby by changing the data stored in the array the docoder can be matched to various configurations of the memory system.

2. The memory of claim 1 wherein said addressing means includes a decoder decoding the number of address bits to select one of the bit lines of the array.

3. The memory of claim 1 wherein said addressing means comprises a plurality of decoders each accpeting a different portion of the number of address bits to select one bit line of the array for each decoder.

4. The memory system of claim 3 wherein said logic means includes a decoder for each of said segments of the memory.

5. The memory system of claim 4 wherein said array and decoders comprising a plurality of standard writeable stores with the decoders being the decoders for the words lines of the standard writeable stores, the bit lines of the array being the word lines of the writeable stores and the word lines of the array being the bit lines of the standard writeable stores whereby the standard writeable stores perform an associative memory function.

* * * * *